(12) United States Patent  
Zheng et al.

(10) Patent No.: US 11,030,439 B2  
(45) Date of Patent: Jun. 8, 2021

(54) FACIAL EXPRESSION SYNTHESIS METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yongsen Zheng, Shenzhen (CN); Xiaolong Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/774,988

(22) Filed: Jan. 28, 2020

(65) Prior Publication Data

US 2020/0167550 A1     May 28, 2020

Related U.S. Application Data

(63) Continuation of application No. PCT/CN2018/097180, filed on Jul. 26, 2016.

(30) Foreign Application Priority Data

Jul. 31, 2017    (CN) .......................... 201710640537.8

(51) Int. Cl.
     *G06K 9/00*      (2006.01)
     *G06T 7/90*      (2017.01)

(52) U.S. Cl.
     CPC ..... *G06K 9/00281* (2013.01); *G06K 9/00234* (2013.01); *G06K 9/00288* (2013.01);
(Continued)

(58) Field of Classification Search
     CPC ........... G06K 9/00281; G06K 9/00234; G06K 9/00288; G06K 9/00302; G06K 9/00362;
(Continued)

(56) References Cited

U.S. PATENT DOCUMENTS

| 2006/0050933 A1* | 3/2006 | Adam ................ G06K 9/00221 382/118 |
| 2012/0007859 A1 | 1/2012 | Lee et al. |

(Continued)

FOREIGN PATENT DOCUMENTS

| CN | 101324961 A | 12/2008 |
| CN | 106056650 A | 10/2016 |

OTHER PUBLICATIONS

The World Intellectual Property Organization (WIPO) International Search Report for PCT/CN2018/097180 dated Oct. 18, 2018 5 Pages (including translation).

*Primary Examiner* — Phuoc Tran

(74) *Attorney, Agent, or Firm* — Anova Law Group, PLLC

(57) ABSTRACT

A facial expression synthesis method is provided. The method includes obtaining a to-be-processed facial image of a target object, and processing the to-be-processed facial image by using a face-recognition operation, to obtain skin color information of the to-be-processed facial image; screening out a target expression-material image, from a plurality of expression-material images in an expression-material image library, matching the skin color information; extracting a region image corresponding to a target synthesis region in the target expression-material image; and performing Poisson fusion processing on the region image and the to-be-processed facial image to fuse the region image with the to-be-processed facial image, so as to obtain a target facial image of the target object.

20 Claims, 10 Drawing Sheets

(52) U.S. Cl.
CPC ............ *G06K 9/00302* (2013.01); *G06T 7/90* (2017.01); *G06T 2207/20221* (2013.01); *G06T 2207/30201* (2013.01)

(58) Field of Classification Search
CPC .. G06K 9/00221; G06K 9/00228; G06T 7/90; G06T 2207/20221; G06T 2207/30201; G06T 11/00; G06T 11/60
See application file for complete search history.

(56) References Cited

U.S. PATENT DOCUMENTS

| | | | | |
|---|---|---|---|---|
| 2012/0299945 | A1* | 11/2012 | Aarabi | G06T 11/60 345/589 |
| 2012/0309520 | A1* | 12/2012 | Evertt | A63F 13/40 463/31 |
| 2015/0279044 | A1* | 10/2015 | Kim | G06T 17/20 345/419 |

* cited by examiner

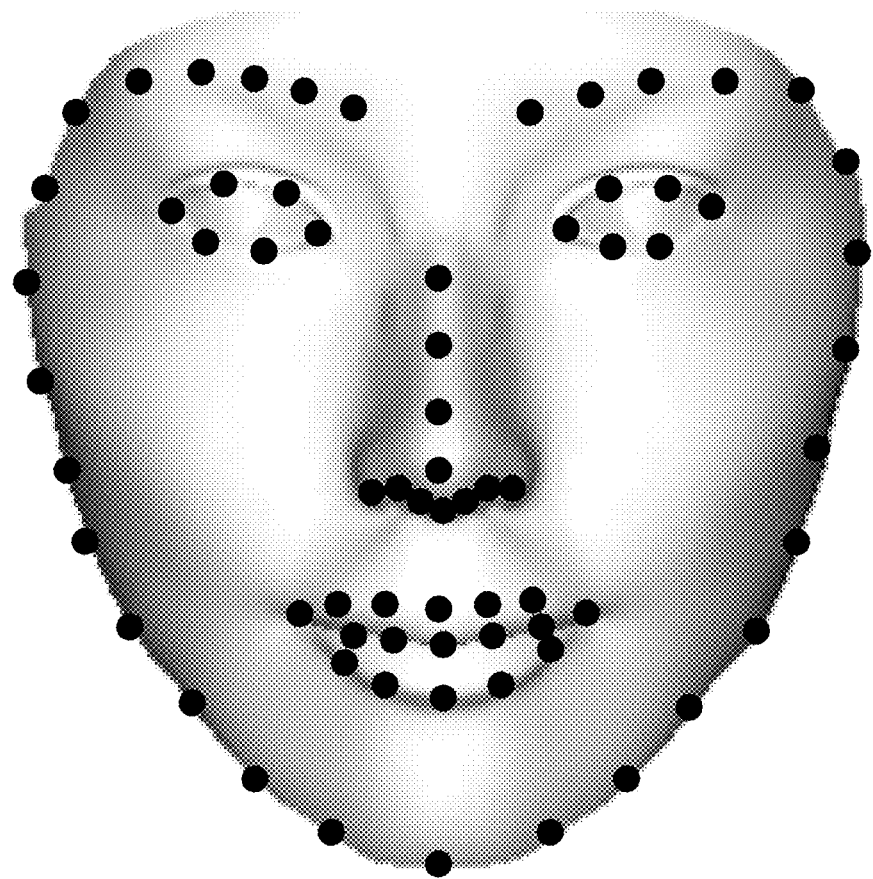
FIG. 3
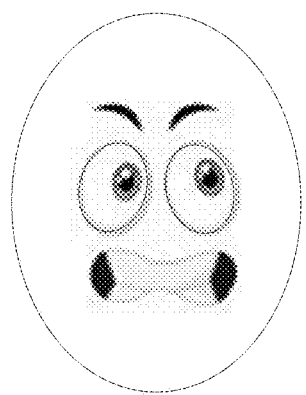 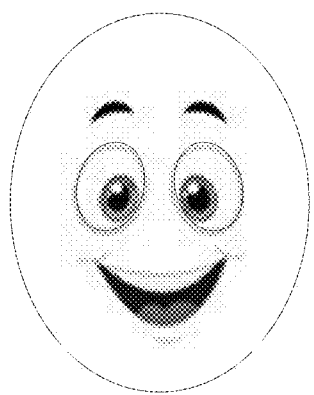
FIG. 4A                    FIG. 4B

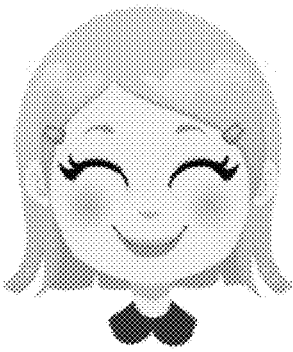
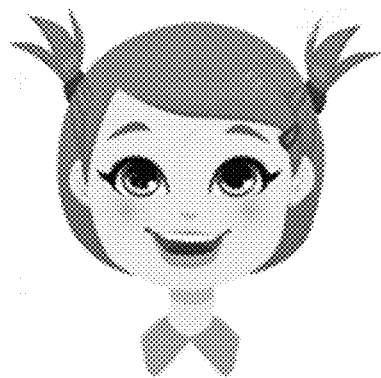
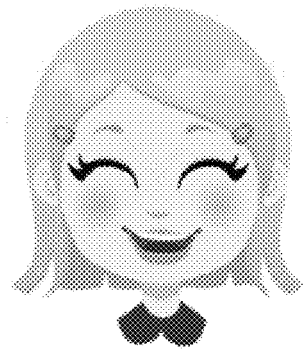
FIG. 9A        FIG. 9B        FIG. 9C
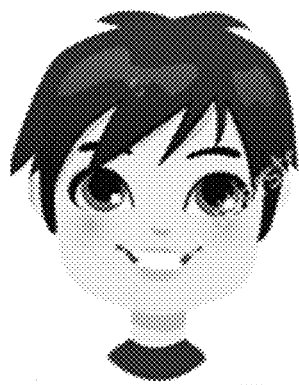
FIG. 9D        FIG. 9E        FIG. 9F

FACIAL EXPRESSION SYNTHESIS METHOD AND APPARATUS, ELECTRONIC DEVICE, AND STORAGE MEDIUM

RELATED APPLICATIONS

This application is a continuation application of PCT Patent Application No. PCT/CN2018/097180, filed on Jul. 26, 2018, which claims priority to Chinese Patent Application No. 201710640537.8, entitled "FACIAL EXPRESSION SYNTHESIS METHOD AND APPARATUS, AND ELECTRONIC DEVICE" and filed with the China National Intellectual Property Administration on Jul. 31, 2017, content of all of which is incorporated by reference in its entirety.

FIELD OF THE TECHNOLOGY

This application relates to the field of data processing technologies and, in particular, to a facial expression synthesis method and apparatus, an electronic device, and a storage medium.

BACKGROUND

Facial expressions are changes of eye muscles, facial muscles, and mouth muscles for showing various emotional states, such as happiness, surprise, sadness, fear, shyness, and anger. As a subtle body language, facial expressions are an important means of conveying emotional information, and the inner world of users can be effectively understood by performing expression analysis on face images, thereby making the face-to-face communication more vivid.

In recent years, the facial expression synthesis has attracted much attention in applications such as character animation, human-computer interaction, and teleconference. People may replace a facial state with a plurality of states according to a personal interest or an actual demand for diversified presentations, thereby improving the mass entertainment and interest.

In the related art, various ways based on a color histogram, a skin color fusion algorithm, and direct paste are usually used to replace facial expressions. For example, an angry mouth of user A is replaced with a smiling mouth of user B, and smiling single-fold eyes of user C are replaced with angry double-fold eyes of user D. However, the changes of facial expressions not only include the movement deformation (such as the opening and closing of the mouth and eyes) of the entire facial feature, but also include subtle changes of the local appearance. The existing facial expression synthesis method achieves a barely satisfactory synthesis effect, and usually has problems such as uneven skin color fusion, incorrect facial organ positioning, and abrupt edges and corners, causing relatively low synthesis efficiency of facial expressions.

The disclosed methods and systems are directed to solve one or more problems set forth above and other problems.

SUMMARY

In view of this, embodiments of the present disclosure provide a facial expression synthesis method and apparatus, an electronic device, and a storage medium, to resolve the technical problems such as uneven skin color fusion, incorrect facial organ positioning, and abrupt edges and corners in synthesized images obtained by using the existing facial expression synthesis method.

One aspect of the present disclosure includes a facial expression synthesis method. The method includes obtaining a to-be-processed facial image of a target object, and processing the to-be-processed facial image by using a face-recognition operation, to obtain skin color information of the to-be-processed facial image; screening out a target expression-material image, from a plurality of expression-material images in an expression-material image library, matching the skin color information; extracting a region image corresponding to a target synthesis region in the target expression-material image; and performing Poisson fusion processing on the region image and the to-be-processed facial image to fuse the region image with the to-be-processed facial image, so as to obtain a target facial image of the target object.

Another aspect of the present disclosure includes an electronic device. The electronic device includes a communications interface; a memory for storing a plurality of instructions; and a processor. The processor is configured to load and execute the plurality of instructions to perform: obtaining a to-be-processed facial image of a target object, and processing the to-be-processed facial image by using a face-recognition operation, to obtain skin color information of the to-be-processed facial image; screening out a target expression-material image, from a plurality of expression-material images in an expression-material image library, matching the skin color information; extracting a region image corresponding to a target synthesis region in the target expression-material image; and performing Poisson fusion processing on the region image and the to-be-processed facial image to fuse the region image with the to-be-processed facial image, so as to obtain a target facial image of the target object.

Another aspect of the present disclosure includes a non-transitory computer-readable storage medium. The non-transitory computer-readable storage medium stores computer program instructions executable by at least one processor to perform: obtaining a to-be-processed facial image of a target object, and processing the to-be-processed facial image by using a face-recognition operation, to obtain skin color information of the to-be-processed facial image; screening out a target expression-material image, from a plurality of expression-material images in an expression-material image library, matching the skin color information; extracting a region image corresponding to a target synthesis region in the target expression-material image; and performing Poisson fusion processing on the region image and the to-be-processed facial image to fuse the region image with the to-be-processed facial image, so as to obtain a target facial image of the target object.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure or the related art more clearly, the following briefly describes the accompanying drawings. Apparently, the accompanying drawings in the following descriptions show merely some, but not all, embodiments of the present disclosure, and a person of ordinary skill in the art may still derive other drawings from these accompanying drawings without creative efforts.

FIG. 3 is a schematic diagram of facial feature points extracted in a facial image according to an embodiment of the present disclosure;

FIG. 4A is a schematic diagram of a to-be-processed facial image of a target object according to an embodiment of the present disclosure;

FIG. 4B is a schematic diagram of a target expression-material image according to an embodiment of the present disclosure;

FIG. 9A and FIG. 9D are respectively to-be-processed facial images of a target object according to an embodiment of the present disclosure;

FIG. 9B is a target expression-material image screened out for the to-be-processed facial image of FIG. 9A;

FIG. 9C is a synthesized image obtained by synthesizing the region image shown in FIG. 9B into the to-be-processed facial image of FIG. 9A;

FIG. 9E is a target expression-material image screened out for the to-be-processed facial image of FIG. 9D;

FIG. 9F is a synthesized image obtained by synthesizing the region image shown in FIG. 9E into the to-be-processed facial image of FIG. 9D;

DESCRIPTION OF EMBODIMENTS

The following describes the technical solutions in the embodiments of the present disclosure with reference to the accompanying drawings. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

A facial expression synthesis method provided in the embodiments of the present disclosure may be applied to an electronic device having a data processing capability. The electronic device may be a server disposed at a network side or may be a terminal device such as a personal computer (PC) disposed at a user side. A computing device may be loaded with a program with a function corresponding to the facial expression synthesis method provided in the embodiments of the present disclosure, to implement the facial expression synthesis method provided in the embodiments of the present disclosure. The program may be stored in a memory of the computing device, and invoked by a processor to implement the program function.

Figure 1:
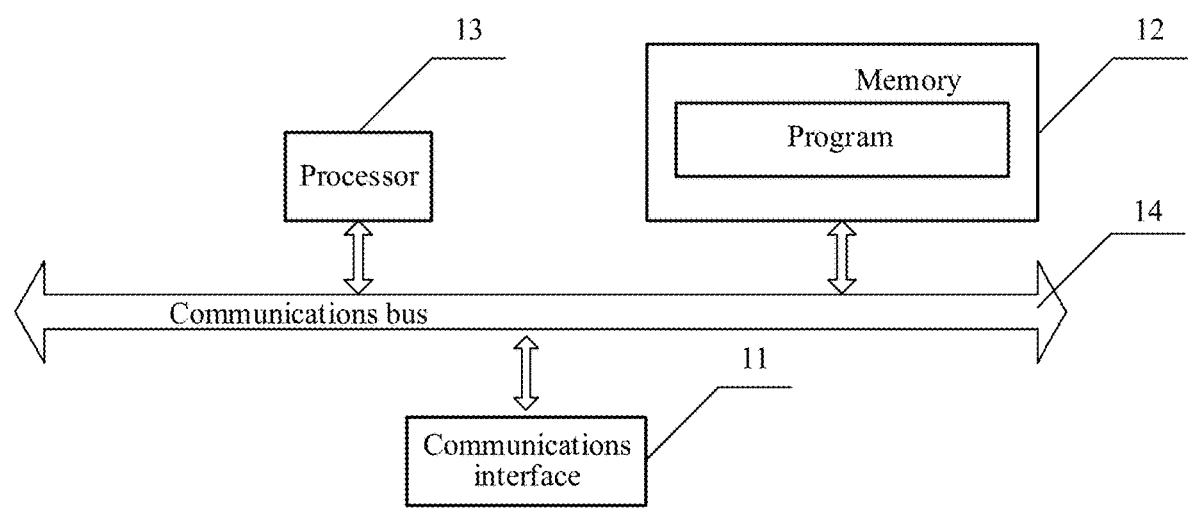
FIG. 1 is a diagram of a hardware structure of an electronic device according to an embodiment of the present disclosure.

FIG. 1 shows a block diagram of a hardware structure of an electronic device according to an embodiment of the present disclosure. Referring to FIG. 1, the electronic device may include: a communications interface 11, a memory 12, a processor 13, and a communications bus 14.

In one embodiment of the present disclosure, quantities of the communications interfaces 11, the memories 12, the processors 13, and the communications buses 14 may all be at least one, and the communications interface 11, the memory 12, and the processor 13 may complete mutual communication through the communications bus 14.

Optionally, the communications interface 11 may be an interface of a communications module, such as an interface of a GSM module, used for implementing data interaction with other devices, such as receiving a required target expression-material image fed back by an expression-material library.

The processor 13 may be a central processing unit (CPU) or an application specific integrated circuit (ASIC), or may be one or more integrated circuits configured to implement the facial expression synthesis method provided in the embodiments of the present disclosure.

The memory 12 may include a high-speed RAM memory or may include a non-volatile memory, for example, at least one magnetic disk memory.

In the present disclosure, the memory 12 may store a program including a plurality of instructions used for implementing the facial expression synthesis method provided in the embodiments of the present disclosure, and the processor 13 invokes and loads the program stored in the memory 13, thereby implementing the facial expression synthesis method provided in the embodiments of the present disclosure. For the implementation process, reference may be made to the description of the following corresponding embodiments.

The hardware structure of the electronic device shown in FIG. 1 is merely optional. According to use needs, the computing device may be further provided with a display screen, an information input apparatus (such as a keyboard or a mouse), a graphics processing unit, an image acquisition device, and the like, which are not described in detail herein in the present disclosure.

The following describes the facial expression synthesis method provided in the embodiments of the present disclosure from the perspective of the electronic device. The following described method steps may be implemented by the electronic device to execute a corresponding program.

Figure 2:
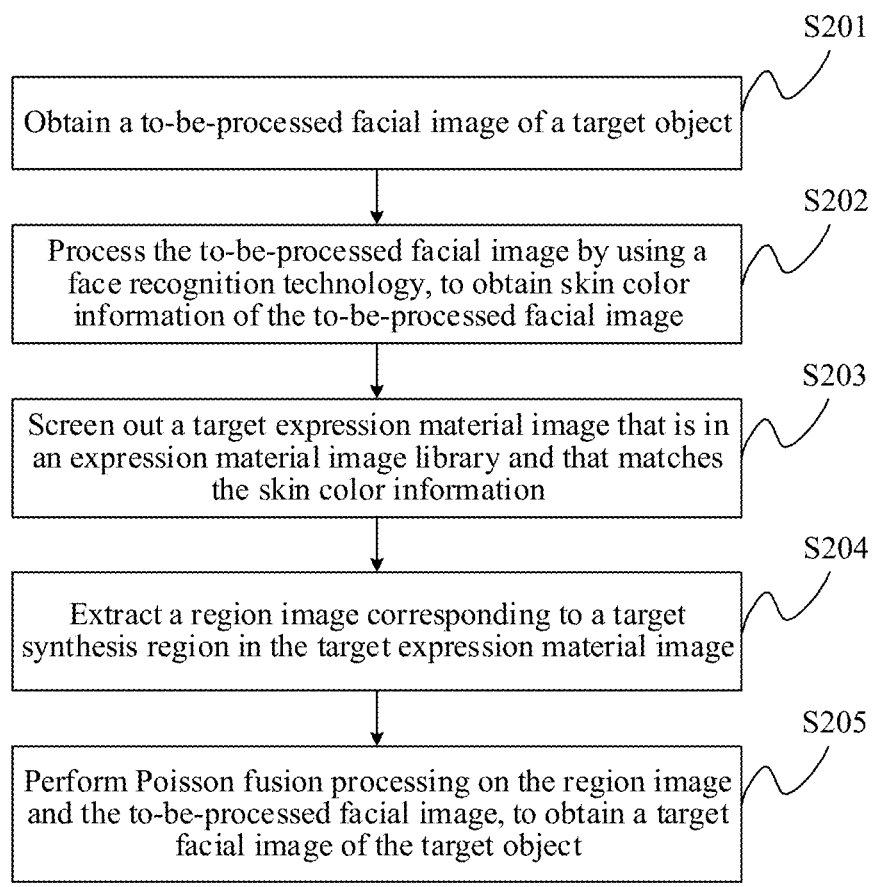
FIG. 2 is a schematic flowchart of a facial expression synthesis method according to an embodiment of the present disclosure.

FIG. 2 is a flowchart of a facial expression synthesis method according to an embodiment of the present disclosure. The method may be applied to an electronic device. Referring to FIG. 2, the method may include the followings S201. Obtain a to-be-processed facial image of a target object.

In the present disclosure, the facial image may be a two-dimensional (2D) image, and may be an image that includes a target object and that is acquired by a terminal device through a camera, or an image that includes a target object and that is retrieved from a local image library, or an image sent by another device. The present disclosure does not limit the manner for obtaining the facial image of the target object.

Optionally, if the electronic device that implements the facial expression synthesis method provided in one embodiment is a terminal device, in actual application, the terminal device may directly acquire an image through a camera, process the acquired image by using a face detection algorithm, and determine whether a facial image of a target object exists in the image. If no facial image exists, the terminal device continues to perform face detection on a next frame of image, until the facial image of the target object is obtained; and if the facial image exists, the terminal device may extract a facial region part of the target object, to obtain the to-be-processed facial image.

Certainly, the terminal device may further directly display a plurality of facial images stored in a local image library, for a user to select one as the to-be-processed facial image of the target object according to requirements. In addition, the terminal device may further obtain the to-be-processed facial image of the target object through other manners, such as downloading from webpages through the Internet, which are not listed herein in the present disclosure.

As another embodiment of the present disclosure, if the electronic device that implements the facial expression synthesis method provided in one embodiment is a server, after determining the to-be-processed facial image of the target object by using the terminal device, the user may directly upload the to-be-processed facial image to the server for subsequent processing.

S202. Process the to-be-processed facial image by using a face-recognition operation, to obtain skin color information of the to-be-processed facial image.

Optionally, after the to-be-processed facial image of the target object is obtained, in the present disclosure, the to-be-processed facial image may be processed by using a facial feature point positioning algorithm, to automatically position a plurality of key facial feature points, such as eyes, the tip of the nose, mouth corner points, eyebrows, and contour points of facial parts, such as the black points shown in FIG. 3. As can be seen, first facial feature points may be a plurality of key facial feature points of the to-be-processed facial image.

The facial feature point positioning algorithm may further include an active shape model (ASM) algorithm, an active appearance model (AAM) algorithm, and the like, and is mainly implemented by using a position constraint combination between a face texture feature and each feature point. The implementation method for recognizing the facial feature points is not described in detail in the present disclosure.

Optionally, the determined key facial feature points may be labeled according to requirements, to determine the shape of the region in which the foregoing components are located. The present disclosure does not limit the method for labeling the key facial feature points.

After a target synthesis region with skin color information to be detected and/or an entire facial region is determined, facial feature points in the corresponding region may be used to form a corresponding polygonal shape. Endpoints of the polygonal shape may be first facial feature points in the corresponding region, and edges usually do not include the first facial feature points in the corresponding region, such as the polygonal shape formed by connecting key feature points at the edge of the mouth in FIG. 3, but is not limited thereto.

Then, in the present disclosure, the images in the formed polygonal shape may be detected by using a skin color detection algorithm, to obtain corresponding skin color information, as a condition of screening out a target expression-material image subsequently.

In the present disclosure, according to different screening conditions, regions (namely, regions encircled by polygonal shapes) with the skin color information to be detected are different. For example, skin color detection is performed on the entire facial region of the to-be-processed facial image, and/or skin color detection is performed on the target synthesis region such as the mouth region, or skin color detection is performed on other regions in the to-be-processed facial image.

For detection regions with different skin color information, the classified storage manners for the expression-material images in the expression-material image library are different. For the implementation process, reference may be made to the description in the following corresponding embodiments. Details are not described herein again in one embodiment.

S203. Screen out a target expression-material image that is in an expression-material image library and that matches the skin color information.

An expression-material image may refer to any image containing a region (e.g., a part of the image) reflecting an expression that may be used for synthesis. A target expression-material image may refer to one expression-material image selected for the synthesis. An expression-material image library may include a plurality of expression-material images to be searched to select the target expression-material image.

In operation, because skin colors of different users have some differences, if the same expression-material is used, skin color requirements of users usually cannot be met. Thus, when the to-be-processed facial image and the expression-material image are fused, their skin colors differ greatly, making the obtained synthesized image very unnatural. Based on this, in the present disclosure, when materials used for synthesizing to-be-processed facial expressions of the target object are screened out, the difference of their skin colors is considered.

Optionally, classified storage may be performed on the plurality of expression-material images included in the expression-material image library according to the corresponding skin color information. Moreover, because the detected skin color information is usually different when a light condition of the same expression-material image is different, for the same expression-material image, classified storage of the skin color information may be further implemented in combination with the light condition. The present disclosure does not limit the storage manner. For example, manners such as table correspondence tables and mapping functions are not described in detail herein in the present disclosure.

The classification of the plurality of expression-material images according to the skin color information may be implemented according to a plurality of pieces of skin color information such as the skin color information of the entire face of each expression-material image, the skin color information of the target synthesis region, and/or the skin color information of other regions, thereby improving the classification precision of the expression-material images. Based on this, the screening of the target expression-material image may be implemented according to the plurality of pieces of skin color information, thereby greatly improving the skin color matching degree between the image obtained through screening and the to-be-processed facial image, and ensuring the finally obtained target facial image to be natural.

Optionally, in the present disclosure, the facial image regions of the expression-material images, the component regions, and the corresponding skin color information may be obtained by using a face recognition algorithm. The implementation method is not described in detail.

S204. Extract a region image corresponding to a target synthesis region in the target expression-material image.

Optionally, similar to the foregoing manner for obtaining the target synthesis region of the to-be-processed facial image, in the present disclosure, facial feature points of the target expression-material image may also be recognized to form a polygonal shape by using the plurality of obtained facial feature points, thereby obtaining the region image corresponding to the target synthesis region.

Figure 4C:
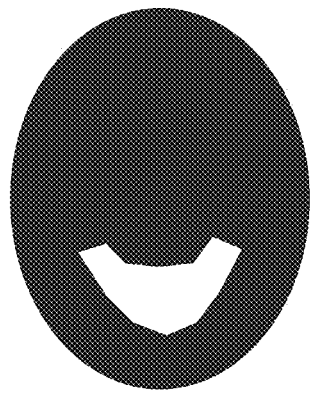
FIG. 4C is a target synthesis region obtained for the target expression-material image of FIG. 4B according to an embodiment of the present disclosure.
Figure 4D:
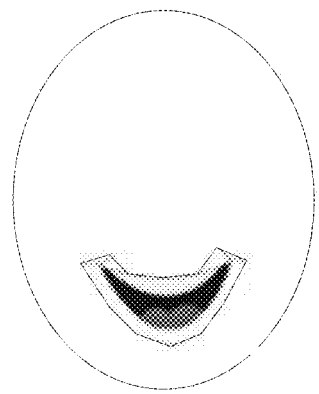
FIG. 4D is a region image corresponding to the target synthesis region shown in FIG. 4C in the target expression-material image of FIG. 4B according to an embodiment of the present disclosure.

For example, assuming that the facial image of the target object is shown in FIG. 4A and the obtained target expression-material image is shown in FIG. 4B, and assuming that when the mouth region in the to-be-processed facial image of the target object needs to be replaced, that is, the mouth region in the target expression-material image needs to be synthesized into the to-be-processed facial image, the polygonal shape shown in FIG. 4C may be formed by connecting the key feature points of the mouth region in the target expression-material image, thereby obtaining the region image that is shown in FIG. 4D and that corresponds to the polygonal shape.

The manner for extracting the region image of the target synthesis region in the target expression-material image is not limited to the manner described above.

S205. Perform Poisson fusion processing on the region image and the to-be-processed facial image, to obtain a target facial image of the target object.

In operation, common image filtering and de-noising algorithms may be classified into two categories: one category is performing global processing on an image, and the other category is using a local operator. The main idea of the global processing is first performing mathematical transformation on the image, then performing filtering in a transform domain, and finally performing inverse transformation to obtain a de-noised image. The main idea of the method of using a local operator is processing a pixel of a noisy image, and only using a local operator on the pixel, which is applicable to a situation in which a noise model cannot be estimated or is hard to be estimated. The algorithms usually include a conventional domain average method, a median filtering algorithm, a template smoothing algorithm, and the like. However, these methods may blur the edges and details of the image while effectively filtering the noise in the image, which affects the processing effect of the image to some extent, and does not conform to the original intention of maintaining detail information as much as possible and making the synthesized image more real and natural.

Therefore, in the present disclosure, spatial position information of factors such as light in a detail indicating image is considered, and filtering processing is performed on the obtained region image by using a Poisson algorithm. Then, the filtered image is synthesized into the to-be-processed facial image by using a Poisson fusion method, to obtain the target facial image. For the process of processing the region image and the to-be-processed facial image by using the Poisson algorithm, reference may be made to the description of the following embodiments. Details are not described herein in one embodiment. However, the processing method for implementing fusion of the region image and the to-be-processed facial image by using the Poisson algorithm is not limited to the method described in the following embodiments of the present disclosure. The present disclosure provides description by using only this example herein.

Accordingly, in the present disclosure, during selecting of the target expression-material, the skin color difference between the to-be-processed facial image and the expression-material image is considered, so that the skin colors of the selected target expression-material image and the to-be-processed face are very close or even the same, thereby ensuring that when the extracted region image is synthesized into the to-be-processed facial image, seamless fusion can be implemented, and the entire skin color of the obtained synthesized image is natural and smooth.

Moreover, in the image fusion process, in the present disclosure, the Poisson fusion manner is used to perform filtering processing on the obtained region image, so that the processed expression details are more robust, thereby reducing the ghosting of the mouth region in the synthesis result, and effectively maintaining the light and skin color information of the face of the target object.

Figure 5:
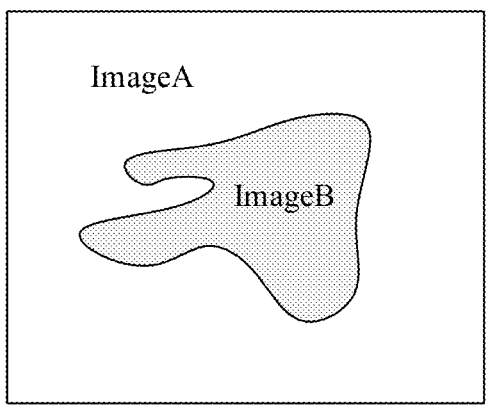
FIG. 5 is a schematic diagram of image synthesis according to an embodiment of the present disclosure.

Optionally, to describe the foregoing image fusion processing process more clearly, the present disclosure provides description with reference to the schematic diagram shown in FIG. 5. ImageA in FIG. 5 is a to-be-processed facial image of an inputted target object, and ImageB is a region image of an obtained target expression-material.

In the image fusion process, it is expected that color change can be performed on ImageB according to ImageA, and feature details of the image, such as edges, corners, and transition, can be remained in a manner. In operation, the Poisson algorithm is usually allowed to adjust absolute information (such as a color) of ImageB, but after ImageB is pasted on ImageA, relative information (such as an image gradient) of ImageB may be remained as much as possible. To implement the technical effect, the boundary constraint of the target facial image may be implemented according to the following formula (1), but is not limited thereto.

$$H_{(x,y)} = A_{(x,y)} \forall (x,y) \in \partial B \quad (1)$$

In the formula (1), A represents the to-be-processed facial image ImageA of the foregoing inputted target object, B represents the region image ImageB of the target expression-material, H represents the synthesized target facial image, $\forall (x,y)$ represents all pixels of H, and $\partial B$ represents the boundary of the region image ImageB.

In the present disclosure, the pixel on the boundary of the target facial image H obtained after the image fusion processing is usually totally the same as the pixel in A on the boundary, so that B can match pixels outside the boundary, and the pixel of A on the boundary of B are mixed inward.

To ensure the synthesis quality of the synthesized target facial image, and make the synthesis region of the synthesized target facial image not abrupt, it is usually required that the gradient of pixels inside H is equal to the gradient of pixels inside B. Therefore, in the present disclosure, the following definition may be made: the gradient spots $\nabla B_{(x,y)}$ of the image are the sum of the differences between the pixel B(x,y) and its all neighboring pixels (such as four pixel points neighboring to the pixel B(x,y): B(x−1,y), B(x+1,y), B(x,y−1), and B(x,y+1)), namely, the following formula (2).

The pixel gradient calculated through this manner is not limited to the pixel gradient calculation method.

$$|\nabla B_{(x,y)}|=4B_{(x,y)}-B_{(x-1,y)}-B_{(x+1,y)}-B_{(x,y-1)}-B_{(x,y+1)} \quad (2)$$

In the formula (2), B(x,y) represents the pixel in ImageB, and ∇ represents the gradient symbol of the image pixel.

Optionally, in the pixel gradient calculation process, if a neighboring pixel of a pixel is a boundary pixel of the image, the pixel in B may be calculated in the manner shown in the formula (3), and the obtained result is usually a fixed value. If the neighboring pixel is just located outside the boundary of the selected pixel, the neighboring pixel may be excluded.

$$|N|H(x, y) - \sum_{(dx,dy)+(x,y)\in\Omega} H(x+dx, y+dy) - \quad (3)$$

$$\sum_{(dx,dy)+(x,y)\in\partial\Omega} A(x+dx, y+dy) =$$

$$\sum_{(dx,dy)+(x,y)\in(\Omega\cup\partial\Omega)} (B(x+dx, y+dy) - B(x, y))$$

where (x,y) is a pixel position of interest in a 2D network, N is a quantity of effective neighboring pixels actually of the pixel in H in a selected region including a boundary (a quantity of image pixels extending outward is less than or equal to 4), Ω is a selected region of B and H without the boundary, and the local "Ω" is the boundary of the selected region, and (dx,dy) belongs to a subset of {(−1,0),(1,0),(0,−1),(0,1)}. Optionally, the foregoing formula (3) may be resolved as follows:

The left side of the equation in the formula (3) is summing differences between H(x,y) and its all N neighboring pixels, to calculate the space gradient of the unknown point H(x,y); and the first sum at the left side of the equation represents the difference between H(x,y) and another pixel point (x',y') on the selected region Ω, (x',y') is the position of the neighboring pixel in H(x,y), and the second sum represents the difference between H(x,y) and the boundary pixel points. The right side of the equation is only the gradient of ImageB at (x,y), and hoped to match the gradient of new ImageH at H(x,y).

For a color image, equation set resolving may be respectively performed on pixels of three channels R, G, and B. For the resolving process of the channels, reference may be made to the calculation process in the foregoing description. Details are not described herein again in the present disclosure.

Figure 6:
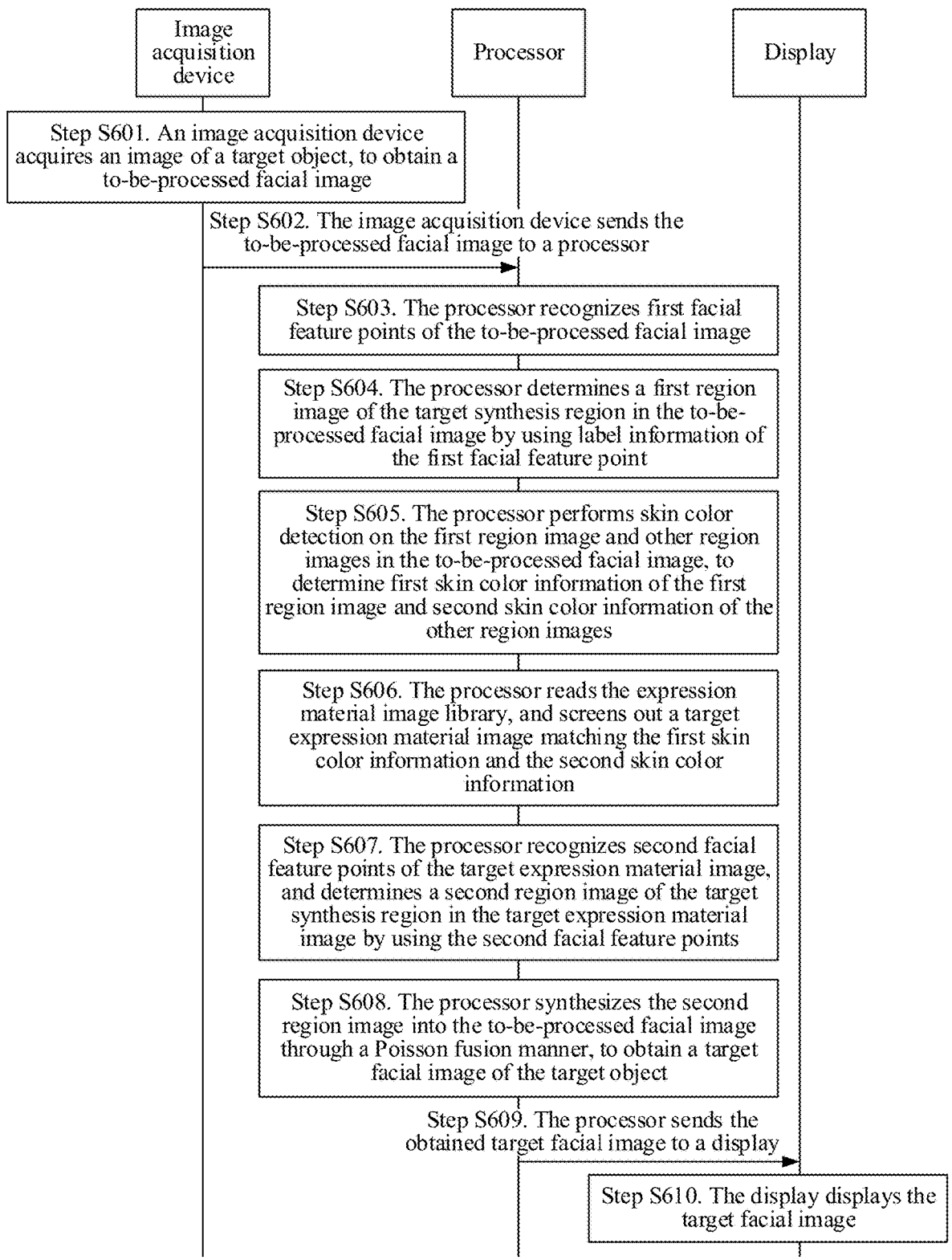
FIG. 6 is a signaling diagram of a facial expression synthesis method according to an embodiment of the present disclosure.

FIG. 6 is a signaling diagram of another facial expression synthesis method according to an embodiment of the present disclosure. One embodiment is described from the perspective of composite hardware of an electronic device, but is not limited to this implementation manner described in one embodiment. Referring to FIG. 6, the method may include the followings.

S601. An image acquisition device acquires an image of a target object, to obtain a to-be-processed facial image.

In the present disclosure, the acquired image may be recognized by using a face-recognition operation, to determine that the currently acquired image includes facial information of the target object, and the image is used as the to-be-processed facial image, or a facial image in the image is extracted as the to-be-processed facial image, which is not limited in the present disclosure.

S602. The image acquisition device sends the to-be-processed facial image to a processor.

Figure 7:
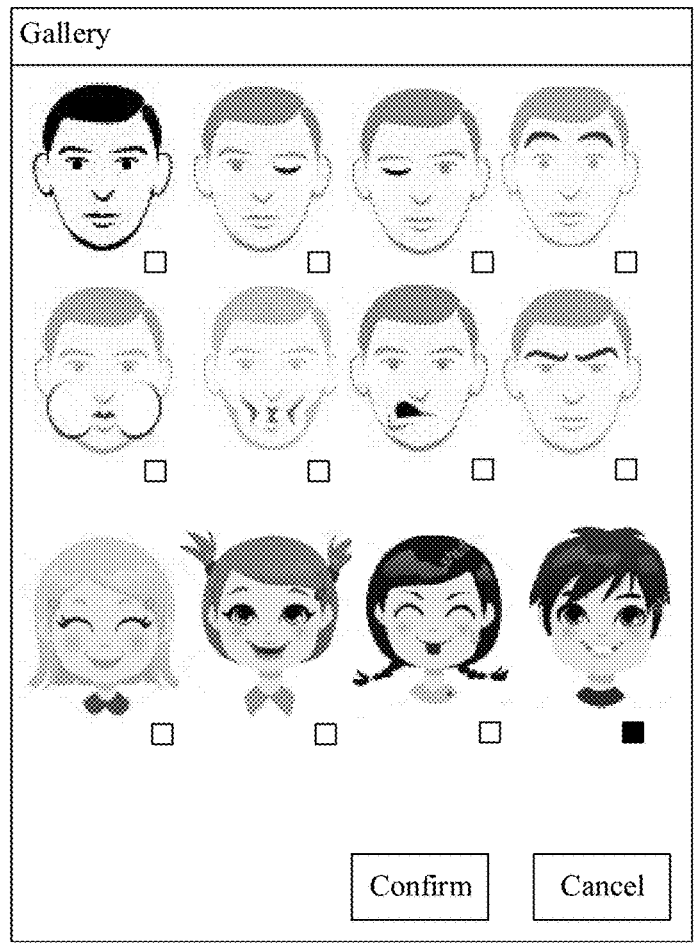
FIG. 7 is a to-be-processed facial expression selection interface according to an embodiment of the present disclosure.

The manner for the processor to obtain the to-be-processed facial image is not limited. As the foregoing description of the embodiment part of the embodiment corresponding to FIG. 2, a plurality of locally stored images of the target object may be further obtained. As shown in FIG. 7, then, a user selects an image as the to-be-processed facial image according to requirements, which is not described in detail herein in the present disclosure.

S603. The processor recognizes first facial feature points of the to-be-processed facial image.

Referring to FIG. 3, in the present disclosure, the to-be-processed facial image may be processed by using a facial feature point positioning algorithm, to automatically position a plurality of key facial feature points, namely, the first facial feature points. Moreover, the determined key facial feature points may be further labeled according to requirements, to determine the shape of the region in which the foregoing components are located. The present disclosure does not limit the method for labeling the key facial feature points.

S604. The processor determines a first region image of the target synthesis region in the to-be-processed facial image by using label information of the first facial feature point.

Because the first facial feature points of the to-be-processed facial image are located on eyebrows, eyes, nose, mouth, and contour line of the face, the shape of components (such as eyes, nose, mouth, eyebrows, and face) of the target object, such as the mouth region, the eye region, and the nose region, can be obtained according to the obtained label information of the plurality of key facial feature points. In one embodiment, replacement of the mouth region is described as an example. The manners for replacing other regions are similar to this, and are not described herein again in the present disclosure.

The target synthesis region may be a mouth region in the to-be-processed facial image, and the first region image is a mouth region image of the to-be-processed facial image. As shown in FIG. 3, key feature points of the mouth may be connected to determine the mouth region and the image thereof, which is not limited thereto.

That is, a polygonal shape corresponding to the first facial feature points of the target synthesis region in the to-be-processed facial image is obtained. Endpoints of the polygonal shape are the first facial feature points of the target synthesis region, and the edges usually do not include the first facial feature points. Then, an image corresponding to the polygonal shape is extracted as a first region that needs to be replaced in the to-be-processed facial image.

S605. The processor performs skin color detection on the first region image and other region images in the to-be-processed facial image, to determine first skin color information of the first region image and second skin color information of the other region images.

In the present disclosure, an OpenCV skin detection algorithm, a skin algorithm based on different color space region divisions, and the like may be used, to implement skin color detection on the first region image and the other region images (especially the region image neighboring to the target synthesis region) in the to-be-processed facial image. The implementation process of the image skin color detection is not described in detail in the present disclosure, and the present disclosure also does not limit the content included in the obtained first skin color information and second skin color information, such as the pixel value of the corresponding part.

Further, the first skin color information refers to skin color information of the region image that needs to be replaced in the to-be-processed facial image of the target object, namely, the skin color information of the mouth region; and the second skin color information may be skin color information of images of other regions except the month of the target object.

As another embodiment of the present disclosure, in the present disclosure, skin color detection may also be performed only on the target synthesis region in the to-be-processed facial image by using the foregoing manner, to obtain the corresponding first skin color information.

S606. The processor reads the expression-material image library, and screens out a target expression-material image matching the first skin color information and the second skin color information.

In one embodiment, when image screening is performed on the expression-material image library, skin color information of the target synthesis region and skin color information of other regions are considered, thereby improving the precision of the target expression-material image, and further ensuring the entire skin color of the finally obtained synthesized image to be natural and smooth.

As another embodiment of the present disclosure, when images of other parts of the face of the target object (namely, images of the region except the target synthesis region) do not need to be changed, the skin color difference state of other parts of the face may not be considered, and the skin color matching degree of the first target region is directly considered. That is, the target expression-material image matching the first skin color information is directly screened out.

Based on the description of the foregoing different screening manners, in the present disclosure, the classified storage manners of the expression-material images in the expression-material image library may be different. If the target expression-material image needs to be screened out by using the first skin color information and the second skin color information, the classified storage may be performed according to standards of at least two aspects: the skin color information of the target synthesis region and the skin color information of other regions. If the first skin color information needs to be used to screen out the target expression-material image, classified storage may be performed according to the skin color information of the target synthesis region in the expression-material images (namely, a region synthesized with the facial expression of the foregoing target object). The present disclosure does not limit the classified storage manner of the expression-material images.

Optionally, in the present disclosure, storage of the facial image regions of the expression-material images, the component regions and the corresponding skin color information may be implemented in a table manner. In this way, after the screening condition (such as the foregoing first skin color information and second skin color information, or only the second skin color information or the first skin color information) for the table is determined, the screening condition may be compared with the skin color information of corresponding items in the table. For example, the first skin color information is compared with the skin color information of the region image that is in the expression-material images and that corresponds to the first target region, and the second skin color information is compared with the skin color information of the facial images of the expression-material images, thereby screening out the target expression-material image matching the first skin color information and the second skin color information.

As another embodiment of the present disclosure, before screening out the expression-material image, in the present disclosure, a first range of a matching value (such as a similar value) of the skin color information of the expression-material image and the first skin color information and a second range of a matching value of the skin color information of the expression-material image and the second skin color information may be preset. In this way, during screening, whether an expression-material image of which the skin color information is the same as both the first skin color information and the second skin color information exists in the expression-material images may be detected. If the expression-material image exists, the expression-material image may be directly used as the target material image. If the expression-material image does not exist, an expression-material image corresponding to skin color information matching the first skin color information most may be screened out from expression-material images whose matching degree with the second skin color information is within the second range as the target expression-material image; or an expression-material image corresponding to skin color information matching the second skin color information most may be screened out from the expression-material images whose matching degree with the first skin color information is within the first range as the target expression-material image, which may be determined according to user settings, and is not limited in the present disclosure.

Optionally, when it is detected that no expression-material image of which the skin color information is the same as both the first skin color information and the second skin color information exists in the expression-material images, an expression-material image whose matching degree with the first skin color information is within the first range, and a plurality of expression-material images whose matching degree with the second skin color information is within the second range may be further screened out, and the plurality of expression-material images is displayed, for the user to select one according to a personal interest as the target expression-material image.

Certainly, if only a target expression-material image matching the first skin color information or the second skin color information needs to be screened out, an example of screening the target expression-material image matching the first skin color information is used for description. Whether an expression-material image of which the skin color information is the same as the first skin color information exists in the expression-material images may be first detected. If the expression-material image exists, the expression-material image may be directly used as a target material image. If the expression-material image does not exist, an expression-material image corresponding to skin color information matching the first skin color information most may be screened as the target expression-material image.

Optionally, the expression-material image library of the present disclosure may be located in the electronic device locally, or may be located at a network side, for the electronic device to send the first skin color information and the second skin color information to the network side for screening. Then, the target expression-material image obtained through screening is fed back to the electronic device. The process is similar to that of one embodiment, and is not described by using an example in the present disclosure.

S607. The processor recognizes second facial feature points of the target expression-material image, and determines a second region image of the target synthesis region in the target expression-material image by using the second facial feature points.

For the implementation methods for recognizing the second facial feature points of the target expression-material image, and determining the second region image, reference may be made to the foregoing description of the implementation method for recognizing the first facial feature points of the to-be-processed facial image, and determining the first region image. Details are not described herein again.

In operation, after the second facial feature points (namely, the key feature points of the target expression-material, such as the black points shown in FIG. 3) of the target expression-material image are determined, a second region image used for synthesizing with the to-be-processed facial image may be selected according to a preset requirement. The preset requirement is determined based on the first region image that needs to be replaced in the to-be-processed facial image, and may include information indicating the target synthesis region, such as space coordinates of the target synthesis region. The present disclosure does not limit the content included in the preset requirement.

Referring to the foregoing FIG. 4A, FIG. 4B, FIG. 4C, and FIG. 4D, the target synthesis region is the mouth region in FIG. 4A. Therefore, after the target expression-material image shown in FIG. 4B is obtained through screening in one embodiment, an image of the mouth region shown in FIG. 4D, namely, the second region image, may be obtained by using the polygonal shape formed by the key feature points. That is, the second region image corresponding to the polygonal shape formed by the second facial feature points of the target synthesis region in the target expression-material image is the region image that is in the target expression-material image and that is used for synthesizing a to-be-processed facial expression.

Optionally, to ensure that the obtained second region image matches the region that needs to be replaced in the to-be-processed facial image, that is, the obtained mouth region image shown in FIG. 4D is fused into the to-be-processed facial image shown in FIG. 4A, the mouth size is in harmony with the face size, which may be implemented by using a facial image three-dimensional model obtained in advance by using facial images of a plurality of sample users. Optionally, a target region may be first determined in the facial image three-dimensional model, and then, the to-be-processed facial image of the target object and the target expression-material image are respectively mapped to the three-dimensional model, thereby obtaining the first region image and the second region image, and ensuring that the first region image and the second region image can be aligned and matched.

Figure 4E:
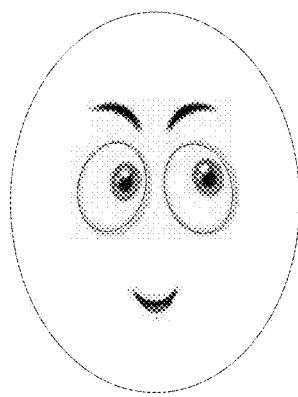
FIG. 4E and FIG. 4F are respectively schematic diagrams of a target facial image according to an embodiment of the present disclosure.

In the present disclosure, scaling processing (e.g., a scaling operation) may also be performed on the second region image, thereby making the processed second region image in overall harmony with the to-be-processed facial image, to avoid an inharmonious situation such as the second region image shown in FIG. 4E being excessively small, which causes the obtained entire synthesized image to be unnatural.

As another embodiment of the present disclosure, in after the target expression-material image is obtained through screening, and before the second region image is extracted, scaling processing is performed on the entire target expression-material image, thereby making the processed target expression-material image be aligned with the to-be-processed facial image, and ensuring that the extracted second region image synthesized into the to-be-processed facial image to be harmonious.

The method for obtaining the first region image and the second region image is not limited to the implementation manner of the foregoing description, and may be further determined by using manners such as coordinate positioning, which is not described in detail herein in the present disclosure.

S608. The processor synthesizes the second region image into the to-be-processed facial image through a Poisson fusion manner, to obtain a target facial image of the target object.

Optionally, in combination with the explanation for the Poisson fusion manner in the foregoing embodiment, step S608 may include: calculating a pixel gradient of the region image by using a pixel in the region image and a corresponding neighboring pixel; synthesizing the second region image into the to-be-processed facial image by using a Poisson algorithm, and calculating a pixel gradient of the obtained synthesized image; using the synthesized image as the target facial image of the target object in a case of determining that the pixel gradient of the synthesized image is equal to the pixel gradient of the second region image; and adjusting the pixel in the second region image in a case of determining that the pixel gradient of the synthesized image is not equal to the pixel gradient of the second region image, until the pixel gradient of the synthesized image is equal to the pixel gradient of the second region image, thereby ensuring that the obtained target facial image to be harmonious.

S609. The processor sends the obtained target facial image to a display.

Optionally, the processor may further send the obtained target facial image to a memory for storage, or to a network side, to implement sharing of the synthesized image. The present disclosure does not limit any implementation method.

S610. The display displays the target facial image.

Figure 4F:
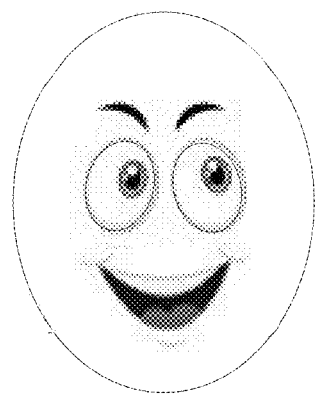

In one embodiment, according to the synthesized image displayed by the display, as shown in FIG. 4F, whether the synthesized image is the image needed by the user may be determined, and if not, image synthesis may be further performed according to the foregoing manner, to obtain the synthesized image required by the user.

Accordingly, in one embodiment, screening for the target expression-material image is implemented in combination with the skin color information of the region that needs to be replaced in the to-be-processed facial image, and the skin color information of other regions, to greatly improve the goodness of fit of the to-be-processed facial image and the region image of the target synthesis region in the target expression-material image, ensure the entire skin color of the synthesized image to be harmonious and natural, and ensure the facial organ positioning. Expression details in the region image are remained, thereby making the obtained synthesized image more vivid, and improving the synthesis efficiency of the facial expression image.

Based on the foregoing description of the facial expression synthesis solution provided in the present disclosure, in operation, such as in a social platform, to increase the fun, by using the foregoing image synthesis method, expression exchange may be performed on two selected facial images, or a region image of a selected facial image may be used to replace the corresponding region image in another facial image, thereby obtaining the result of facial expression change, such as changing an angry object to a happy object.

Figure 8:
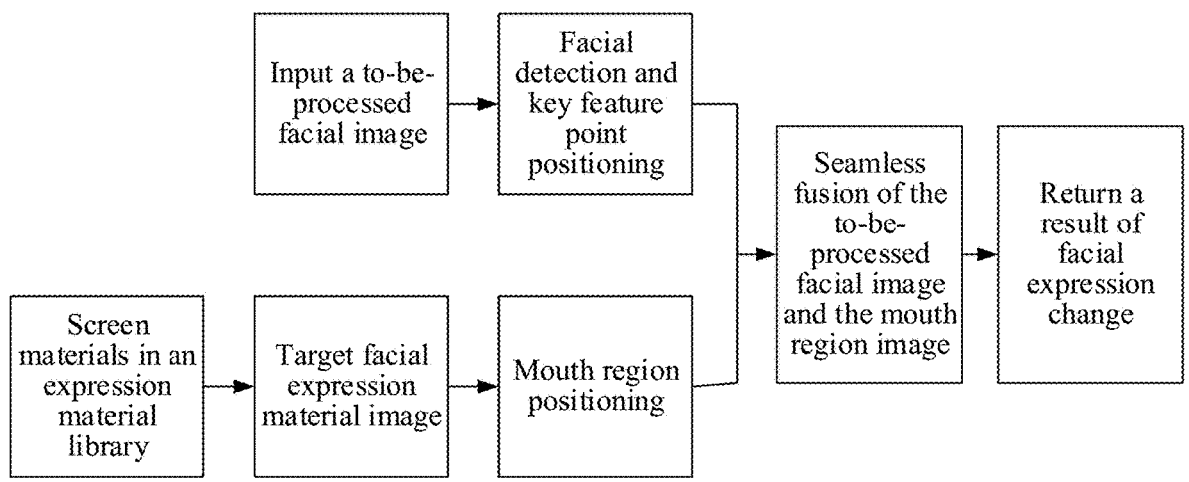
FIG. 8 is a schematic flowchart of another facial expression synthesis method according to an embodiment of the present disclosure.

Optionally, in combination with the schematic flowchart of the facial expression synthesis method shown in FIG. 8, when the user intends to replace the mouth expression of object A (as shown in FIG. 9A or FIG. 9D), an image of object B for implementing image synthesis may be selected according to the foregoing manner and in combination with skin color information of object A and the mouth region. For example, for the to-be-processed facial image shown in FIG. 9A, the target expression-material image shown in FIG. 9B is screened out; and for the to-be-processed facial image shown in FIG. 9D, the target expression-material image shown in FIG. 9E is screened out. Then, through extraction and preprocessing of the region image, the mouth region of object B may be fused into the image of object A in combination with the Poisson fusion algorithm, thereby making object A have the mouth expression of object B. As the synthesized image shown in FIG. 9C, the smiling mouth in FIG. 9A is replaced with the laughing mouth in FIG. 9B; and as the synthesized image shown in FIG. 9F, the grinning mouth in FIG. 9D is replaced with the mouth with the tongue sticking out in FIG. 9E.

Therefore, in the present disclosure, various expressions of the target object can be obtained by using the foregoing manner, and the fun for the user to use the facial expression is increased.

In the present disclosure, the foregoing target synthesis region is not limited to the mouth region, and may be further an eye region, a nose region, and the like. The implementation methods are similar and are not described in detail herein again in the present disclosure.

Figure 10:
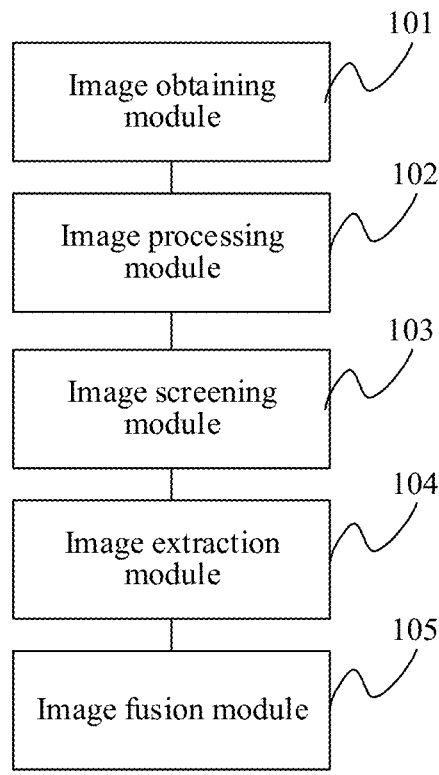
FIG. 10 is a structural block diagram of a facial expression synthesis apparatus according to an embodiment of the present disclosure.

FIG. 10 is a structural block diagram of a facial expression synthesis apparatus according to an embodiment of the present disclosure. The apparatus is applied to or integrated in an electronic device. The electronic device may be a terminal device or a server. That is, the apparatus provided in the present disclosure may be applied to a terminal side or a network side. The composite structures are the same and are not separately described again in the present disclosure. In one embodiment, the apparatus may include: an image obtaining module 101, an image processing module 102, an image screening module 103, an image extraction module 104, and an image fusion module 105.

The image obtaining module 101 is configured to obtain a to-be-processed facial image of a target object.

Optionally, the image obtaining module 101 may obtain the to-be-processed facial image by using an image acquisition device, or may obtain, through a communications interface, to-be-processed facial images transmitted by other devices, which is not limited in the present disclosure.

The image processing module 102 is configured to process the to-be-processed facial image by using a face-recognition operation, to obtain skin color information of the to-be-processed facial image.

Figure 11:
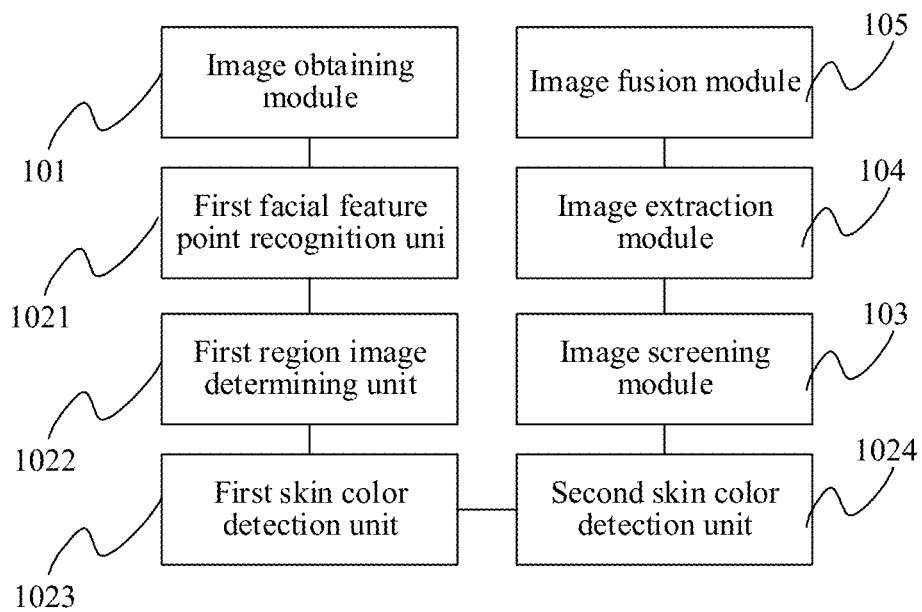
FIG. 11 is a structural block diagram of another facial expression synthesis apparatus according to an embodiment of the present disclosure.

Optionally, referring to FIG. 11, the image processing module 102 may include: a first facial feature point recognition unit 1021, configured to recognize first facial feature points of the to-be-processed facial image; a first region image determining unit 1022, configured to determine a first region image of a target synthesis region in the to-be-processed facial image by using the first facial feature points; and a first skin color detection unit 1023, configured to perform skin color detection on the first region image, to obtain first skin color information.

For the extraction of the facial feature points and the skin color detection method of the image, reference may be made to the description in the corresponding parts in the foregoing embodiments. Details are not described herein.

In addition, as shown in FIG. 11, the image processing module 102 may further include: a second skin color detection unit 1024, configured to perform skin color detection on other region images of the to-be-processed facial image, to obtain second skin color information.

For different composition structures of the image processing module 102, screening standards set to screen out the target expression-material images may be different.

The image screening module 103 is configured to screen out a target expression-material image that is in an expression-material image library and that matches the skin color information.

In the present disclosure, if the image processing module 102 only obtains the first skin color information or the second skin color information, the image screening module 103 may be configured to screen out a target expression-material image matching the first skin color information or the second skin color information. If the image processing module 102 obtains the first skin color information and the second skin color information, the image screening module 103 may be configured to screen out a target expression-material image matching the first skin color information and the second skin color information.

For different screening manners, manners for storing expression-material images in the expression-material image library may be different. For the content, reference may be made to the description of the corresponding parts of the foregoing method embodiments.

The image extraction module 104 is configured to extract a region image corresponding to a target synthesis region in the target expression-material image.

Figure 12:
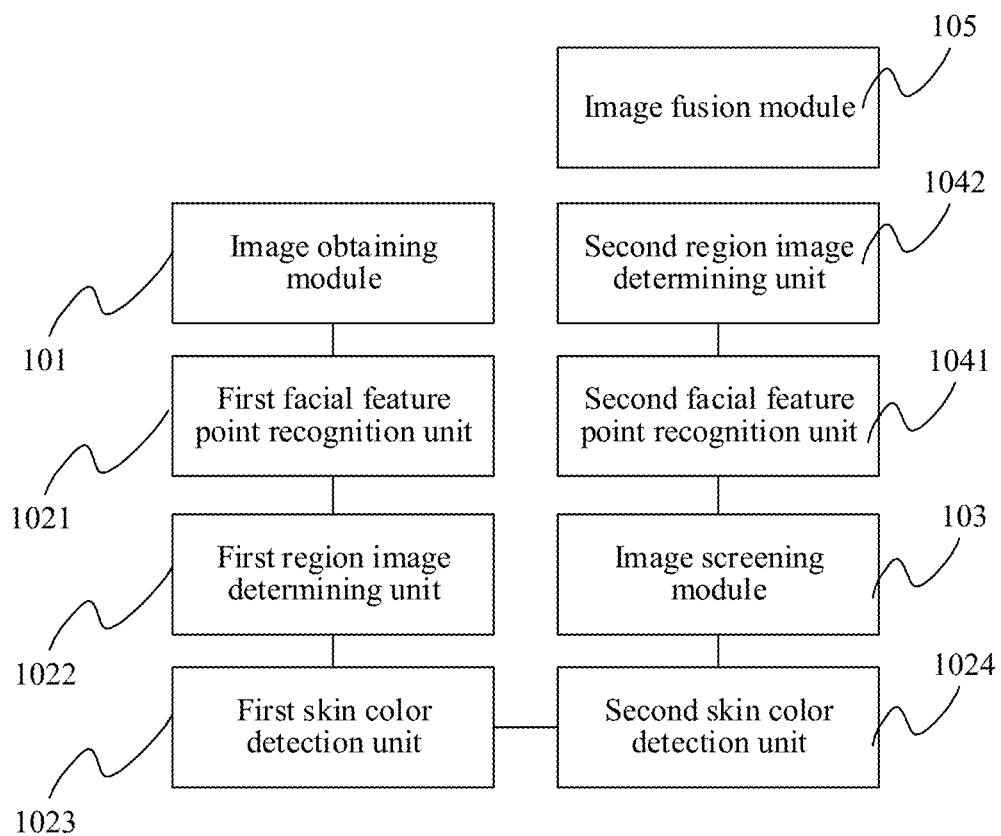
FIG. 12 is a structural block diagram of still another facial expression synthesis apparatus according to an embodiment of the present disclosure.

Optionally, as shown in FIG. 12, the image extraction module 104 may include: a second facial feature point recognition unit 1041, configured to recognize second facial feature points of the target expression-material image; and a second region image determining unit 1042, configured to determine a second region image corresponding to the target synthesis region in the target expression-material image by using the second facial feature points.

The image fusion module 105 is configured to perform Poisson fusion processing on the region image and the to-be-processed facial image, to obtain a target facial image of the target object.

Figure 13:
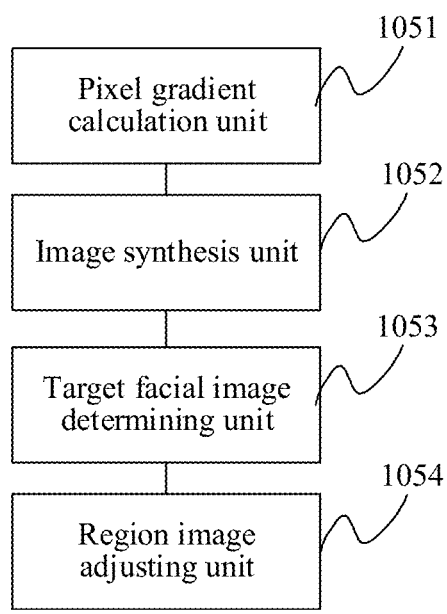
FIG. 13 is a structural block diagram of yet another facial expression synthesis apparatus according to an embodiment of the present disclosure.

Optionally, as shown in FIG. 13, the image fusion module 105 may include: a pixel gradient calculation unit 1051, configured to calculate a pixel gradient of the region image by using a pixel in the region image and a corresponding neighboring pixel; an image synthesis unit 1052, configured to synthesize the region image into the to-be-processed facial image by using a Poisson algorithm, and calculate a pixel gradient of the obtained synthesized image; a target facial image determining unit 1053, configured to use the synthesized image as the target facial image of the target object in a case of determining that the pixel gradient of the synthesized image is equal to the pixel gradient of the region image; and a region image adjusting unit 1054, configured to adjust the pixel in the region image in a case of determining that the pixel gradient of the synthesized image is not equal to the pixel gradient of the region image, until the pixel gradient of the synthesized image is equal to the pixel gradient of the region image.

As another embodiment of the present disclosure, on the basis of the foregoing embodiments, the apparatus may further include: an image adjusting module, configured to perform scaling processing on the target expression-material image according to the to-be-processed facial image, so that the processed target expression-material image is aligned with the to-be-processed facial image.

Before the image fusion processing, the adjusting method for the region image is not limited to the manner of the image adjusting module, and reference may be made to the description of the corresponding parts in the foregoing method embodiments. Details are not described herein again in one embodiment.

Accordingly, in the present disclosure, when an expression image of a region of a to-be-processed facial image of a target object needs to be modified, a target expression-material image matching the skin color may be selected according to skin color information of the region and skin color information of other regions, thereby ensuring that after a region image of a target synthesis region obtained from the target expression-material image is synthesized into the to-be-processed facial image, the entire skin color of the synthesized image is harmonious, and expression details in the region image are remained, thereby making the synthesized image more vivid. Moreover, because the target synthesis region is positioned based on facial feature points in the present disclosure, the positioning precision of to-be-replaced organs is ensured, and the synthesis efficiency of the facial expression image is improved.

The foregoing provides description mainly from the functional modules of the facial expression synthesis apparatus, and the following describes the hardware structure of the electronic device from the perspective of the hardware composite structure.

Referring to the diagram of the hardware structure of the electronic device shown in FIG. 1, the electronic device may include: a communications interface 11, a memory 12, and a processor 13.

The communications interface 11 may be used for implementing communication with other devices, or reading an expression-material image stored in the local memory 12.

The memory 12 is configured to store a plurality of instructions for implementing the foregoing facial expression synthesis method.

The processor 13 is configured to load and execute the plurality of instructions stored in the memory 12, including: obtaining a to-be-processed facial image of a target object, and processing the to-be-processed facial image by using a face-recognition operation, to obtain skin color information of the to-be-processed facial image; screening out a target expression-material image that is in an expression-material image library and that matches the skin color information; extracting a region image corresponding to a target synthesis region in the target expression-material image; and performing Poisson fusion processing on the region image and the to-be-processed facial image, to obtain a target facial image of the target object.

An embodiment of the present disclosure further provides a storage medium. Optionally, in one embodiment, the storage medium stores a computer program. The computer program, when run, is configured to perform a data loading method.

Optionally, in one embodiment, the storage medium may be located in at least one of a plurality of network devices in the network shown in the foregoing embodiments.

Optionally, in one embodiment, the storage medium is configured to store program code for performing the following steps:

S1. Obtain a to-be-processed facial image of a target object, and process the to-be-processed facial image by using a face-recognition operation, to obtain skin color information of the to-be-processed facial image.

S2. Screen out a target expression-material image that is in an expression-material image library and that matches the skin color information.

S3. Extract a region image corresponding to a target synthesis region in the target expression-material image.

S4. Perform Poisson fusion processing on the region image and the to-be-processed facial image, to obtain a target facial image of the target object.

Optionally, the storage medium is further configured to store program code used for performing the following steps: recognizing first facial feature points of the to-be-processed facial image; determining a first region image of a target synthesis region in the to-be-processed facial image by using the first facial feature points; and performing skin color detection on the first region image, to obtain first skin color information.

Optionally, the storage medium is further configured to store program code used for performing the following steps: screening out a target expression-material that is in the expression-material image library and that matches the first skin color information.

Optionally, the storage medium is further configured to store program code used for performing the following steps: performing skin color detection on other region images of the to-be-processed facial image, to obtain second skin color information; and the screening out a target expression-material image that is in an expression-material image library and that matches the skin color information includes: screening out a target expression-material that is in the expression-material image library and that matches the first skin color information and the second skin color information.

Optionally, the storage medium is further configured to store program code used for performing the following steps: recognizing second facial feature points of the target expression-material image; and determining a second region image corresponding to the target synthesis region in the target expression-material image by using the second facial feature points.

Optionally, the storage medium is further configured to store program code used for performing the following steps: before the extracting a region image corresponding to a target synthesis region in the target expression-material image, performing scaling processing on the target expression-material image according to the to-be-processed facial image, so that the processed target expression-material image is aligned with the to-be-processed facial image.

Optionally, the storage medium is further configured to store program code used for performing the following steps: obtaining a polygonal shape corresponding to facial feature points of the target synthesis region in the target expression-material image, where endpoints of the polygonal shape are the facial feature points of the target synthesis region; and extracting an image corresponding to the polygonal shape, as a region image used for synthesizing with a to-be-processed facial expression.

Optionally, the storage medium is further configured to store program code used for performing the following steps: calculating a pixel gradient of the region image by using a pixel in the region image and a corresponding neighboring pixel; synthesizing the region image into the to-be-processed facial image by using a Poisson algorithm, and calculating a pixel gradient of the obtained synthesized image; using the synthesized image as the target facial image of the target object in a case of determining that the pixel gradient of the synthesized image is equal to the pixel gradient of the region image; and adjusting the pixel in the region image in a case of determining that the pixel gradient of the synthesized image is not equal to the pixel gradient of the region image, until the pixel gradient of the synthesized image is equal to the pixel gradient of the region image.

Optionally, for specific examples in one embodiment, reference may be made to the examples described in the foregoing embodiments. Details are not described herein again in one embodiment.

Optionally, in one embodiment, the storage medium may include, but is not limited to: any medium that can store program code, such as a USB flash drive, a read-only memory (ROM), a random access memory (RAM), a removable hard disk, a magnetic disk, or an optical disc.

The embodiments in this specification are all described in a progressive manner. Description of each of the embodiments focuses on differences from other embodiments, and reference may be made to each other for the same or similar parts among respective embodiments. The apparatus and the electronic device disclosed in the embodiments correspond to the method disclosed in the embodiments and therefore are only briefly described, and reference may be made to the method parts for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it is not to be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a RAM, an internal memory, a ROM, an electrically programmable ROM (EPROM), an electrically erasable programmable ROM (EEPROM), a register, a hard disk, a removable magnetic disk, a CD-ROM, or any storage medium of other forms well-known in the art.

The above descriptions of the disclosed embodiments make a person skilled in the art implement or use the present disclosure. Various modifications to these embodiments are obvious to a person skilled in the art, and the general principles defined in this specification may be implemented in other embodiments without departing from the core concept and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. A facial expression synthesis method comprising:
    obtaining a to-be-processed facial image of a target object, and processing the to-be-processed facial image by using a face-recognition operation, to obtain skin color information of the to-be-processed facial image;
    screening out a target expression-material image, from a plurality of expression-material images in an expression-material image library, matching the skin color information;
    extracting a region image corresponding to a target synthesis region in the target expression-material image; and
    performing Poisson fusion processing on the region image and the to-be-processed facial image to fuse the region image with the to-be-processed facial image, so as to obtain a target facial image of the target object.

2. The method according to claim 1, wherein the processing the to-be-processed facial image by using a face-recognition operation, to obtain skin color information of the to-be-processed facial image comprises:
    recognizing first facial feature points of the to-be-processed facial image;
    determining a first region image of a target synthesis region in the to-be-processed facial image by using the first facial feature points; and
    performing skin color detection on the first region image, to obtain first skin color information.

3. The method according to claim 2, wherein the screening out a target expression-material image, from a plurality of expression-material images in an expression-material image library, matching the skin color information comprises:
    screening out an expression-material image that is in the expression-material image library and that matches the first skin color information as the target expression-material image.

4. The method according to claim 2, wherein the method further comprises:
    performing skin color detection on other region images of the to-be-processed facial image, to obtain second skin color information; and
    screening out a target expression-material image, from a plurality of expression-material images in an expression-material image library, matching the skin color information comprises:
    screening out an expression-material image that is in the expression-material image library and that matches the first skin color information and the second skin color information as the target expression-material image.

5. The method according to claim 2, wherein the extracting a region image corresponding to a target synthesis region in the target expression-material image comprises:
    recognizing second facial feature points of the target expression-material image; and
    determining a second region image corresponding to the target synthesis region in the target expression-material image by using the second facial feature points.

6. The method according to claim 5, wherein before the extracting a region image corresponding to a target synthesis region in the target expression-material image, the method further comprises:
    performing scaling processing on the target expression-material image according to the to-be-processed facial image, so that the processed target expression-material image is aligned with the to-be-processed facial image.

7. The method according to claim 1, wherein the extracting a region image corresponding to a target synthesis region in the target expression-material image comprises:
    obtaining a polygonal shape corresponding to facial feature points of the target synthesis region in the target expression-material image, wherein endpoints of the polygonal shape are the facial feature points of the target synthesis region; and
    extracting an image corresponding to the polygonal shape, as a region image used for synthesizing with a to-be-processed facial expression.

8. The method according to claim 1, wherein the performing Poisson fusion processing on the region image and the to-be-processed facial image to fuse the region image with the to-be-processed facial image, so as to obtain a target facial image of the target object comprises:
- calculating a pixel gradient of the region image by using a pixel in the region image and a corresponding neighboring pixel;
- synthesizing the region image into the to-be-processed facial image by using a Poisson algorithm, and calculating a pixel gradient of the obtained synthesized image;
- using the synthesized image as the target facial image of the target object in a case of determining that the pixel gradient of the synthesized image is equal to the pixel gradient of the region image; and
- adjusting the pixel in the region image in a case of determining that the pixel gradient of the synthesized image is not equal to the pixel gradient of the region image, until the pixel gradient of the synthesized image is equal to the pixel gradient of the region image.

9. An electronic device, comprising:
a communications interface;
a memory for storing a plurality of instructions; and
a processor configured to load and execute the plurality of instructions to perform:
- obtaining a to-be-processed facial image of a target object, and processing the to-be-processed facial image by using a face-recognition operation, to obtain skin color information of the to-be-processed facial image;
- screening out a target expression-material image, from a plurality of expression-material images in an expression-material image library, matching the skin color information;
- extracting a region image corresponding to a target synthesis region in the target expression-material image; and
- performing Poisson fusion processing on the region image and the to-be-processed facial image to fuse the region image with the to-be-processed facial image, so as to obtain a target facial image of the target object.

10. The electronic device according to claim 9, wherein the processing the to-be-processed facial image by using a face-recognition operation, to obtain skin color information of the to-be-processed facial image comprises:
- recognizing first facial feature points of the to-be-processed facial image;
- determining a first region image of a target synthesis region in the to-be-processed facial image by using the first facial feature points; and
- performing skin color detection on the first region image, to obtain first skin color information.

11. The electronic device according to claim 10, wherein the screening out a target expression-material image, from a plurality of expression-material images in an expression-material image library, matching the skin color information comprises:
- screening out an expression-material image that is in the expression-material image library and that matches the first skin color information as the target expression-material image.

12. The electronic device according to claim 10, wherein the method further comprises:
- performing skin color detection on other region images of the to-be-processed facial image, to obtain second skin color information; and
- screening out a target expression-material image, from a plurality of expression-material images in an expression-material image library, matching the skin color information comprises:
  - screening out an expression-material image that is in the expression-material image library and that matches the first skin color information and the second skin color information as the target expression-material image.

13. The electronic device according to claim 10, wherein the extracting a region image corresponding to a target synthesis region in the target expression-material image comprises:
- recognizing second facial feature points of the target expression-material image; and
- determining a second region image corresponding to the target synthesis region in the target expression-material image by using the second facial feature points.

14. The electronic device according to claim 13, wherein before the extracting a region image corresponding to a target synthesis region in the target expression-material image, the processor further performs:
- performing scaling processing on the target expression-material image according to the to-be-processed facial image, so that the processed target expression-material image is aligned with the to-be-processed facial image.

15. The electronic device according to claim 9, wherein the extracting a region image corresponding to a target synthesis region in the target expression-material image comprises:
- obtaining a polygonal shape corresponding to facial feature points of the target synthesis region in the target expression-material image, wherein endpoints of the polygonal shape are the facial feature points of the target synthesis region; and
- extracting an image corresponding to the polygonal shape, as a region image used for synthesizing with a to-be-processed facial expression.

16. The electronic device according to claim 9, wherein the performing Poisson fusion processing on the region image and the to-be-processed facial image to fuse the region image with the to-be-processed facial image, so as to obtain a target facial image of the target object comprises:
- calculating a pixel gradient of the region image by using a pixel in the region image and a corresponding neighboring pixel;
- synthesizing the region image into the to-be-processed facial image by using a Poisson algorithm, and calculating a pixel gradient of the obtained synthesized image;
- using the synthesized image as the target facial image of the target object in a case of determining that the pixel gradient of the synthesized image is equal to the pixel gradient of the region image; and
- adjusting the pixel in the region image in a case of determining that the pixel gradient of the synthesized image is not equal to the pixel gradient of the region image, until the pixel gradient of the synthesized image is equal to the pixel gradient of the region image.

17. A non-transitory computer-readable storage medium storing computer program instructions executable by at least one processor to perform:
- obtaining a to-be-processed facial image of a target object, and processing the to-be-processed facial image by using a face-recognition operation, to obtain skin color information of the to-be-processed facial image;
- screening out a target expression-material image, from a plurality of expression-material images in an expression-material image library, matching the skin color information;

extracting a region image corresponding to a target synthesis region in the target expression-material image; and performing Poisson fusion processing on the region image and the to-be-processed facial image to fuse the region image with the to-be-processed facial image, so as to obtain a target facial image of the target object.

18. The non-transitory computer-readable storage medium according to claim 17, wherein the processing the to-be-processed facial image by using a face-recognition operation, to obtain skin color information of the to-be-processed facial image comprises:

recognizing first facial feature points of the to-be-processed facial image;

determining a first region image of a target synthesis region in the to-be-processed facial image by using the first facial feature points; and performing skin color detection on the first region image, to obtain first skin color information.

19. The non-transitory computer-readable storage medium according to claim 18, wherein the screening out a target expression-material image, from a plurality of expression-material images in an expression-material image library, matching the skin color information comprises:

screening out an expression-material image that is in the expression-material image library and that matches the first skin color information as the target expression-material image.

20. The non-transitory computer-readable storage medium according to claim 18, wherein the computer program instructions are executable by at least one processor to further perform:

performing skin color detection on other region images of the to-be-processed facial image, to obtain second skin color information; and screening out a target expression-material image, from a plurality of expression-material images in an expression-material image library, matching the skin color information comprises:

screening out an expression-material image that is in the expression-material image library and that matches the first skin color information and the second skin color information as the target expression-material image.

* * * * *